Aug. 23, 1960     T. A. BILLINGS     2,949,945
CUTTER TYPE LAND CLEARING IMPLEMENT
Filed July 13, 1959     2 Sheets-Sheet 1
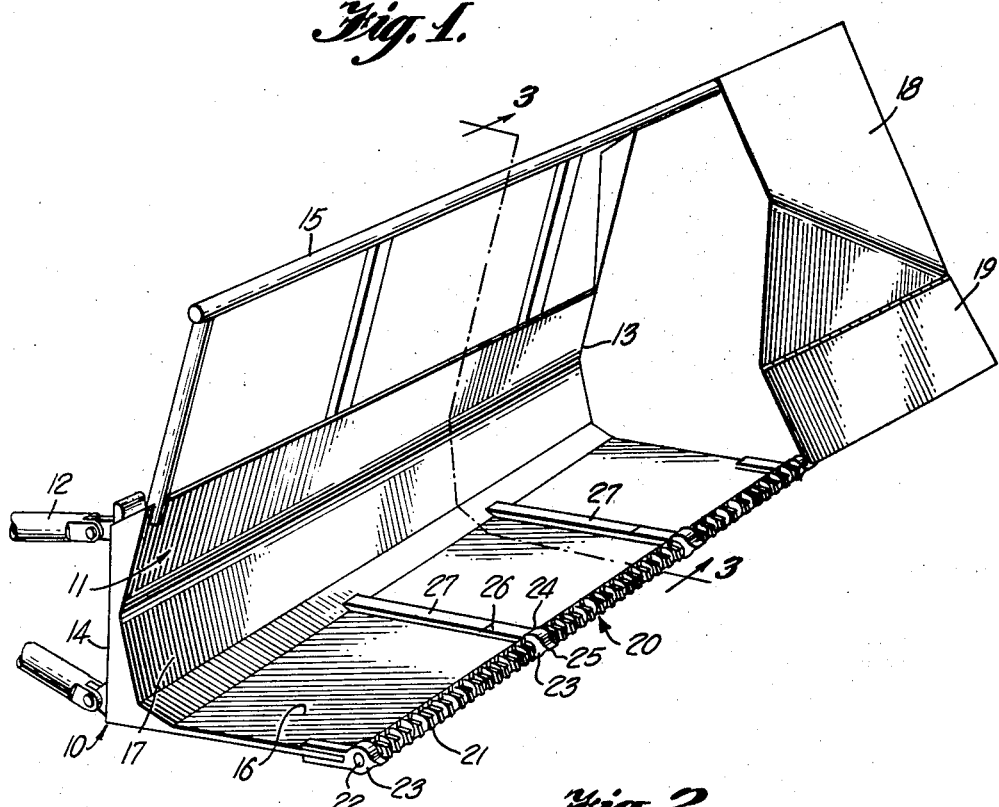
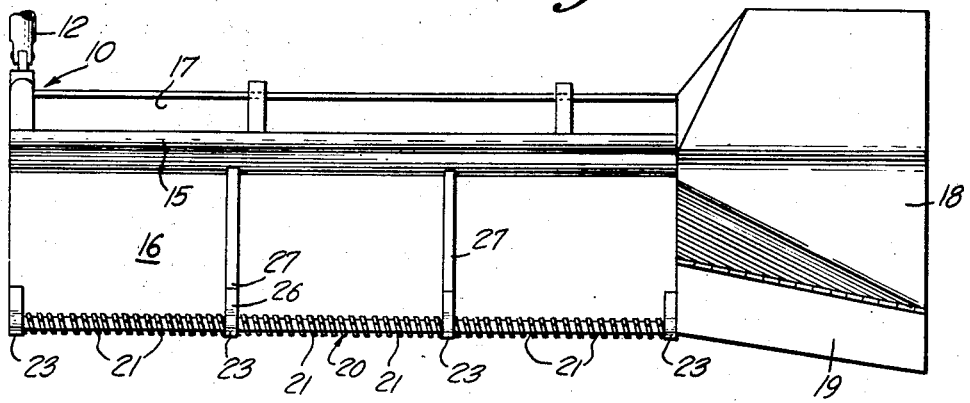
INVENTOR
Thomas A. Billings
BY Mason, Fenwick & Lawrence
ATTORNEYS Aug. 23, 1960 T. A. BILLINGS 2,949,945
CUTTER TYPE LAND CLEARING IMPLEMENT
Filed July 13, 1959 2 Sheets-Sheet 2

INVENTOR
Thomas A. Billings
BY
Mason, Fenwick & Lawrence
ATTORNEYS

United States Patent Office

2,949,945
Patented Aug. 23, 1960

2,949,945

CUTTER TYPE LAND CLEARING IMPLEMENT

Thomas A. Billings, 3778 W. Colonial Drive, Orlando, Fla.

Filed July 13, 1959, Ser. No. 826,799

5 Claims. (Cl. 144—34)

The present invention relates in general to land-clearing apparatus, and more particularly to a tractor-propelled land-clearing implement adapted to be mounted on a crawler-type or rubber-tired tractor and having a pusher or scraper blade together with a rotary saw or cutter at the lower edge of the blade.

This application is a continuation-in-part of my co-pending application Serial No. 689,595, filed October 11, 1957, issued July 14, 1959, as Patent No. 2,894,544.

There are many pieces of equipment now available commercially for uprooting trees and clearing underbrush and other debris above ground level. Bulldozers, scrapers, and pusher-blades with tree knock-down boom attachments have been provided for these purposes. There is, however, a great demand for equipment for clearing at ground level to obviate the necessity of further clearing or uprooting of roots, and for leaving the ground smooth. Clearing equipment of the types enumerated above either uproot the trees and brush when the blade is set above-ground level, leaving substantially all of the low level growth and many depressions resulting from uprooting of the tree and brush root systems, or the blade must be set to cut below ground level, in which case large quantities of earth are moved along with the ground cover, altering the grade and requiring much more powerful tractor equipment due to the load imposed by the earth to be moved and much greater consumption of time and fuel.

An object of the present invention is the provision of a novel land-clearing implement to be supported on and moved by a tractor or other vehicle, which facilitates mass clearing of forest growth to ground level.

Another object of the present invention is to provide a bulldozer blade type of cutting implement which will cut obliquely of the path of travel of the implement to facilitate progress through the growth to be cleared.

Another object of the present invention is the provision of a novel land-clearing implement for tractors having a pusher or scraper blade and a power-driven rotary saw unit disposed at the lower edge of the blade to completely cut all trees, brush and growth at or near ground level.

Other objects, advantages and capabilities of the present invention will become apparent from the following detailed description, taken in conjunction with the accompanying drawings illustrating a preferred form of the invention.

In the drawings:

Figure 1 is a perspective view of a land-clearing implement embodying the present invention, wherein the rotary cutter is associated with a single wing type of pusher or scraper blade;

Figure 2 is a top plan view of the implement illustrated in Figure 1;

Figure 3:
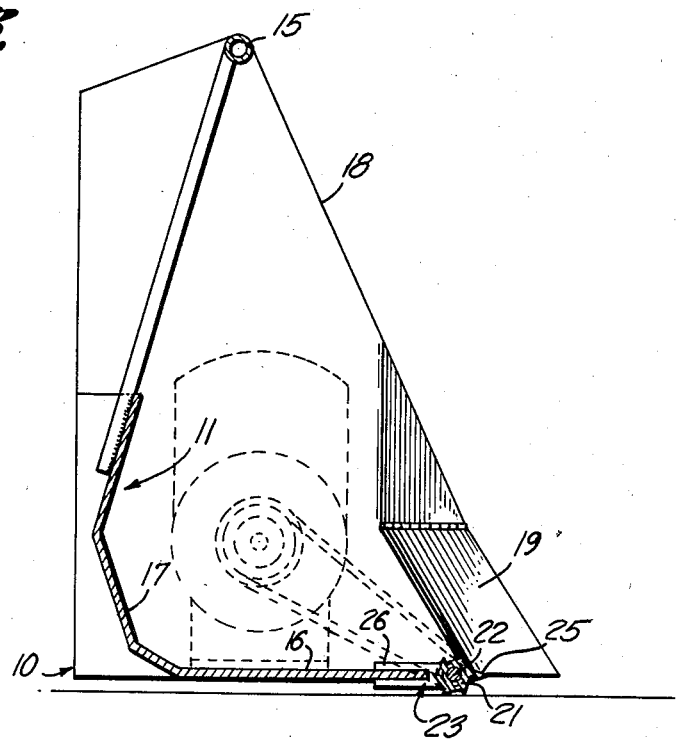
Figure 3 is a fragmentary section view taken along the line 3—3 of Figure 2.
Figure 4:
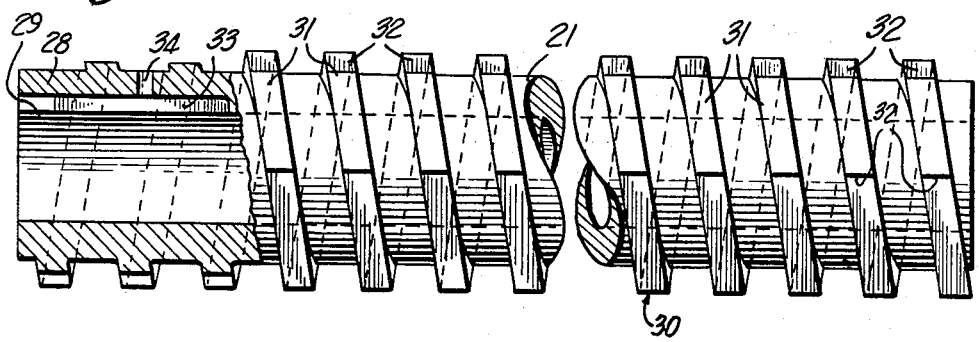
Figure 4 is an enlarged detail front elevation of one of the cutter sections forming the rotary cutter.

Referring to the drawings, wherein like reference characters designate corresponding parts throughout the several figures, the land-clearing implement, indicated generally by the reference character 10, includes the usual pusher or scraper blade 11 of the type employed in bulldozers and like earth-moving equipment, which is supported on the usual side arms, indicated generally at 12, extending from a crawler or rubber-tired tractor or like vehicle and adjustable by a conventional hydraulic mechanism or the like for raising or lowering the position of the pusher blade 11 relative to the ground level. The implement 10 will be positioned obliquely to the direction of travel of the implement and the tractor to provide a leading end 13 and a trailing end 14, and may have a conventional tree-bumper or boom 15 rigidly carried by the blade 11 to protect the operator from trees falling in the direction of the associated vehicle.

A large forwardly projecting toe plate 16 is welded or otherwise fixed to the lower edge of the concave face 17 of the blade 11 and extends in a substantially horizontal plane forwardly of the blade. A motor shield 18 is rigidly supported at one end of the blade 11, here shown adjacent the leading end 13 and has an inclined wedge plate 19 forming a sharp wedge-type point at the forward edge of the shield 18. The toe plate 16 extends uninterruptedly from the trailing end 14 of the blade 11 to the adjacent edge of the shield 18 where the shield 18 joins the leading end 13 of the pusher blade 11, or may project beyond the leading end 13 to the end of the shield 18 remote therefrom to entirely underlie the shield 18. Supported at the leading edge of the toe plate 16 for rotation about a horizontal axis is a laterally elongated rotary cutter 20 which extends substantially the full width of the blade 11. The cutter 20 is formed of a plurality of identical cutter sections 21, each formed as an integral cylindrical casting, disposed in axial alignment on an elongated shaft 22. The shaft 22 is supported in a plurality of bearing cages 23, four being shown in the embodiment herein illustrated. Each bearing cage 23 comprises an annular body portion 24 adapted to surround and journal the shaft 22 for rotation therein, an integral forwardly projecting, wedge-shaped formation 25 and a rearwardly projecting bifurcated portion 26 adapted to embrace and be welded or otherwise affixed to the forward portion of the toe plate 16. Additional reinforcing straps or ribs 27 may, if desired, be provided on the upper or lower surfaces of the toe plate 16, or both, to reinforce the toe plate 16, these reinforcing straps 27 being shown in alignment with the intermediate bearing cages 23 in Figures 1 and 2.

In the preferred embodiment, a pair of cutter sections or castings 21 are provided between each adjacent pair of bearing cages 23. The cutter castings 21 are each formed of an integral casting of steel or other suitable material, which may be alloyed to provide great tensile strength and hardness to insure long wear. Each casting 21 comprises a cylindrical body portion 28 having a cylindrical bore 29 extending entirely therethrough of a diameter to accommodate and closely conform to the drive shaft 22, and a helical or spiral rib formation 30 integrally formed with and projecting radially from the body portion 28 and extending along a helical path from end-to-end throughout the length of the section 21. The helical rib formation 30 has a sawtooth profile as illustrated clearly in Figure 5 of the drawings to form the cutting teeth 31 of the cutter section. The sawtooth profile of the rib formation 30 is such as to provide a plurality of equally spaced teeth 31, the preferred form herein illustrated having six teeth per revolution of the helical rib formation 30. For example, the cylindrical body portion 28 of the cutter section 21 may have a length of 13¾ inches and a diameter of 3⅜ inches, the inner diameter of the bore 29 may be 1⅜ inches, and the rib formation 30 may have a width of ⅜ inch and a pitch such that the centers of corresponding parts of successive convolutions are spaced one inch apart longitudinally of the section 21. The tips or points of the cutting teeth 31 in this example are spaced ⅞₆ of an inch from the body portion 28 and the radial surfaces 32 of the teeth 31 have a radial length of ⁵⁄₁₆ inch.

The shaft 22 is provided with either a continuous keyway or groove, or a plurality of spaced keyways, and one end of each of the sections 21 is provided with a keyway 33 adapted to receive a key which projects into the shaft keyway and into the keyway 33 of each section 21 when these keyways are in registry to lock the cutter sections 21 and the shaft 22 against relative rotation. A threaded set screw aperture 34 may extend through the body portion 28 of the section 21 into communication with the keyway 33 to receive a threaded set screw and permit locking of the key within the keyway 33.

One end of the shaft 22 projects into the motor shield 18 and is connected by a suitable drive linkage, such as a gear drive, a chain and sprocket drive or the like, with a motor indicated generally at 35, supported within the motor shield 18. It will be appreciated that the motor 35 may be a gasoline-powered motor or other well-known types of independent motors, and that the drive shaft 22 may alternatively the driven, if desired, from the tractor or from any other desired power source.

Figure 5:
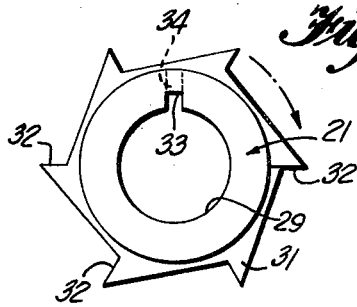
Figure 5 is an end elevation of the cutter section.

The group of cutter sections 21 are driven by the motor 35 and shaft 22 in the direction of the arrow shown in Figure 5. As the saw unit rotates, the teeth cut into the trees, brush, heavy grass, or earth in their path and chip or cut them away in much the same manner as a milling cutter. Due to the cutting action of the saw-teeth, the load imposed on the tractor is greatly reduced so that a much smaller tractor can do the work which now requires a large, heavy tractor with other types of cutting, tree-crashing or uprooting devices. The arrangement of the teeth along a helical path permits the chips, sawdust and dirt to be continuously removed from the cutter unit and the plate on which the saw is mounted so that there is no resultant clogging at any time.

Due also to the particular design and construction of the cutter sections, the cutting plane can be readily altered without injury to the material of the cutter unit, thus permitting tilt of the tractor without danger of breakage of the cutter due to shift in the relative position laterally of the cutting edge with the objects being cut. Thus it is unnecessary to keep the tractor on any given path, as this cutter unit will adapt itself to any motion of which the tractor is capable. The particular arrangement and construction herein described avoids wear of the type which would be encountered with chain-type saws wherein substantial wear arises from action of the links in the chain against themselves. The assembly of the cutter from the plurality of cutter sections permits ready replacement of parts if breakage or excessive wear arises.

It will be apparent that such a rotary cutter arrangement is not confined to use with single wing type of pusher blades, but that it is equally adaptable to use with V-type pusher blades and other known blade arrangements.

While but one specific embodiment of the invention has been specifically shown and described, it is apparent that various modifications may be made in the invention without departing from the spirit and scope thereof, and it is desired, therefore, that only such limitations be placed thereon as are imposed by the prior art and are set forth in the appended claims.

What is claimed is:

1. A brush and tree cutting attachment for tractors comprising a bulldozer blade adapted to be mounted forwardly of a tractor, a cutter supporting member secured to the lower edge of said bulldozer blade and projecting forwardly therefrom, a shaft journaled at and extending along the forward edge of said cutter supporting member and lying in the plane thereof, toothed cutter means keyed on said shaft and supported therewith at said forward edge of said cutter supporting member, said shaft and toothed cutter means extending transversely of said tractor substantially the width of said bulldozer blade and the cutter means having a plurality of milling teeth thereon, and driving means for said toothed cutter means for rotating the same about the axis of and with said shaft.

2. A brush and tree cutting attachment for tractors comprising a bulldozer blade adapted to be mounted forwardly of a tractor at an angle relative to the longitudinal axis thereof, a cutter supporting member secured to the lower edge of said bulldozer blade and projecting forwardly therefrom in a substantially horizontal plane, a shaft journaled at and extending along the forward edge of said cutter supporting member and lying in the plane thereof, toothed cutter means keyed on said shaft and supported therewith at said forward edge of said cutter supporting member, said shaft and toothed cutter means extending transversely of said tractor substantially the width of said bulldozer blade and the cutter means having a plurality of milling teeth thereon, and driving means for said toothed cutter means for rotating the same about the axis of and with said shaft.

3. The combination recited in claim 2, wherein said shaft extends the full width of said bulldozer blade, and said toothed cutter means comprises a cylindrical body supported on said shaft disposed for rotation about a horizontal axis lying parallel to the lower edge of the bulldozer blade and a helical rib projection extending from said cylindrical body along the length thereof having a saw tooth profile providing a plurality of milling teeth operating forwardly of said cutter supporting member.

4. A brush and tree cutting attachment for tractors comprising a bulldozer blade adapted to be mounted forwardly of a tractor including a horizontally disposed substantially planar toe plate section adapted to traverse a ground surface to be cleared terminating in a substantially rectilinear leading edge extending transversely of the tractor and a vertically disposed section projecting from the trailing edge of said horizontally disposed toe plate section, a plurality of bearing members fixed to said horizontally disposed toe plate section adjacent the leading edge thereof at spaced locations along said leading edge, a shaft journalled in said bearing members and extending along the leading edge of said toe plate section and located immediately forwardly of said leading edge with said shaft arranged on a rectilinear axis of rotation lying parallel to said leading edge and in the plane of said toe plate section, a plurality of cylindrical milling type cutters disposed in coaxial alignment on said shaft and extending substantially continuously between each adjacent pair of said bearing members, means connecting each of said cutters to said shaft to cause said cutters to rotate with said shaft, said shaft and said cutters extending along said axis of rotation substantially the width of said toe plate section, said cutters each having a helical rib formation of saw-tooth profile extending from end to end along each cutter providing a plurality of milling teeth operating forwardly of said toe plate section, and driving means for rotating said shaft and said cutters about said axis of rotation.

5. The combination recited in claim 4, wherein said bearing members include annular portions concentric with said axis of rotation to surround and journal said shaft and integral forwardly projecting wedge shaped portions projecting to an apex spaced forwardly of the forwardmost extent of the teeth of said cutters.

(References on following page)

References Cited in the file of this patent

UNITED STATES PATENTS

| | | |
|---|---|---|
| 335,309 | Rendall | Feb. 9, 1886 |
| 1,263,385 | Delas | Apr. 23, 1918 |
| 2,615,262 | Reid | Oct. 28, 1952 |
| 2,701,591 | Kissner et al. | Feb. 8, 1955 |
| 2,894,544 | Billings | July 14, 1959 |

FOREIGN PATENTS

| | | |
|---|---|---|
| 6,335 of 1901 | Great Britain | Mar. 26, 1901 |